United States Patent [19]

Bleichrodt et al.

[11] Patent Number: 4,906,505

[45] Date of Patent: Mar. 6, 1990

[54] SKIN-SHAPED PRODUCT OF AMINOPLAST RESIN MIXTURE AND FIBROUS MATERIAL

[75] Inventors: Frederik Bleichrodt, Sittard; Henricus W. M. L. Kalthoff, Herten; Hubertus M. C. Stijnen, Stein, all of Netherlands

[73] Assignee: Stamicarbon B.V., Geleen, Netherlands

[21] Appl. No.: 233,443

[22] Filed: Aug. 18, 1988

[30] Foreign Application Priority Data

Aug. 18, 1987 [NL] Netherlands ............... 8701933

[51] Int. Cl.$^4$ ............................................. B32B 27/42
[52] U.S. Cl. ............................... 428/290; 428/524; 523/222; 524/598
[58] Field of Search ............. 523/222; 428/290, 524; 524/598

[56] References Cited

U.S. PATENT DOCUMENTS

| | | | |
|---|---|---|---|
| 3,953,632 | 4/1976 | Robinson | 428/290 |
| 4,046,937 | 9/1977 | McCaskey et al. | 428/524 |
| 4,182,701 | 1/1980 | Cottrell, Jr. et al. | |
| 4,324,832 | 4/1982 | Moroff et al. | 428/290 |
| 4,410,481 | 10/1983 | Mayerhoffer | 264/319 |
| 4,430,380 | 2/1984 | Honel et al. | 428/290 |
| 4,478,771 | 10/1984 | Schreiber | |
| 4,542,068 | 9/1985 | Whichard | 428/290 |
| 4,756,955 | 7/1988 | Rias | 264/113 |

FOREIGN PATENT DOCUMENTS

| | | |
|---|---|---|
| 1068462 | 11/1959 | Fed. Rep. of Germany . |
| 1094859 | 3/1955 | France . |
| 82/03198 | 9/1982 | World Int. Prop. O. . |

OTHER PUBLICATIONS

European Search Report, Application No. 88201756.9.
International Search Report, International Application No. PCT/CH82/00037.
Abstract, JP-A-60 127 148, by Matsushita Electric Works (1983).
Brydson; Plastics Materials; Newnes–Butterworths; 1975; pp. 542, 543, 555, 564.

*Primary Examiner*—Lewis T. Jacobs
*Attorney, Agent, or Firm*—Cushman, Darby & Cushman

[57] ABSTRACT

The invention relates to a skin-shaped product comprising an aminoplast-formaldehyde resin mixture and fibrous material and is characterized in that the resin mixture has a viscosity of 25 Pa.s–15.10$^3$ Pa.s at 120° C. in the skin-shaped product and that the fibrous material in the form of a fleece or a mat has a strength of 0.1 MPa–20 MPa at 20° C.

10 Claims, No Drawings

SKIN-SHAPED PRODUCT OF AMINOPLAST RESIN MIXTURE AND FIBROUS MATERIAL

The invention relates to a skin-shaped product comprising an aminoplast resin mixture which is the reaction product of an amino compound with formaldehyde, and further including fibrous material.

Such a skin-shaped product is described in EP-A-51060 and is used to produce insulation boards. Boards used for insulation purposes consist of foamed resin material and are not sufficiently strong to be suitable for construction purposes.

Aminoplast resins have attractive properties per se to be used for construction purposes. They are very flame resistant as compared with unsaturated polyester, and they are much more colourable than phenol-formaldehyde resins.

The aim of the invention is a composition based on an aminoplast resin in the form of a skin-shaped product, which can be processed similarly to skin-shaped unsaturated polyester sheet moulding compounds. An SMC based on unsaturated polyester is a skin-shaped product that is almost dry at room temperature and has a very high viscosity and that is fluid at increased temperature and pressure. This fluidity is important, because usually such a portion of an SMC is placed in a mould that about 70% of the surface of the mould is covered.

The aim of the invention is achieved by a skin-shaped product comprising an aminoplast resin mixture and fibrous material being characterized in that the resin mixture has a viscosity of 25 Pa.s–15,000 Pa.s at 120° C. in the skin-shaped product and that the fibrous material, in the form of a fleece or a mat, has a tensile strength of 0.1 MPa–20 MPa at room temperature.

The skin-shaped product preferably comprises 30–95 wt% aminoplast resin mixture and 5–70 wt% fibrous material.

A skin-shaped product with fibrous material is known per se from EP-A-130920. However, EP-A-130920 describes the application of discontinuous fibres. These skin-shaped products are sticky and cannot be processed without additional supporting maaterial (such as a conveyor belt, a thermoplastic film or a film for decorative purposes).

It should be noted that the processes described in EP-A-51060 and EP-A-130920 are used to produce boards which are to a greater or lesser extent foamed, with the water present serving partly as foaming agent.

By specifically choosing the viscosity of the resin mixture and the tensile strength of the fleece or the mat of fibrous material as a function of the temperature, a skin-shaped product is obtained that is excellently suitable to be processed in the same manner as an unsaturated polyester sheet moulding compound.

The lower limit of the tensile strength is determined by the strength necessary to resist the forces that are generated when the fibrous material is impregnated and in further processing, such as drying, rolling, lifting, etc. This required strength depends somewhat on the width and on the thickness of the material but can be simply determined for each individual case and is approximately larger than 0.1 MPa in the machines currently known. Preferably a stronger fibrous material is used, namely with a strength larger than 1 MPa (measured at room temperature).

The viscosity of the resin must be such that the fibrous material is pulled apart during moulding. This is essential because, as described above, a mould is filled to only 30–80% of its area and in moulding the mass fills the entire mould. If the fibres did not flow along with the rest of the compound, a product with unbalanced mechanical properties would be obtained. In particular projections, ridges and rims are subject to relatively large forces when products are used and it is therefore important that the fibrous material is included in these too. The necessary viscosity of the resin mixture therefore depends on the tensile strength of the fibrous material in the skin-shaped product. This tensile strength depends on the strength of the bond between the filaments, caused by the coating (or sizing) and can be influenced by the solvents present in the resin mixture and by the temperature. In view of the minimum strength of the fibrous material, the viscosity of the resin mixture must be greater than 25 Pa.s at 120° C. (Brookfield). Aminoplast resins usually have a very low viscosity under compression moulding conditions and therefore do not meet the aforementioned requirement. To increase the viscosity, the resin can be partly polymerized until the desired viscosity is obtained. A simple and cheap method is to use fillers in the resin. Preferably a resin mixture with 10–70 wt% fillers, more in particular 20–60 wt% fillers, is used. Especially useful are mixtures that result in a moulding compound with at least 30 wt.% of filler.

The upper limit of the viscosity of the resin mixture is determined by the processability and is about 15,000 Pa.s. Preferably a resin mixture is used which has a viscosity of 50 Pa.s–5,000 Pa.s (at 120°).

The upper limit of the viscosity of the resin mixture also determines the upper limit of the strength of the fibrous material, which is approximately 20 MPa. Preferably fibrous material with a strength of less than 10 MPa is used.

An aminoplast resin is used as resin. Urea, melamine or benzoguanamine may, for example, be used as the amino compound. Preferably, melamine is used on account of its superior mechanical properties. The resin can be prepared in a manner known to a person skilled in the art by causing the amino compound and formaldehyde to react in water. The proportion of, for example, formaldehyde and melamine is usually between 1.3 and 2.5, preferably between 1.5 and 2.0. If so desired, the amino compound may be partly replaced by, for example, phenol, but this may unfavourably affect the colour. Plasticizers may also be added, for example sorbitol, -caprolactam, ethylene glycol, trioxytol, toluenesulphonamide and benzo- and acetoguanamine.

Preferably glass fibre is used as fibrous material, but other fibres are also suitable, for example rock fibre, carbon fibre, cotton and polyamides, cellulose. The fibrous material is usually used in the form of a fleece or a mat, or a mat with 6–60 mm long fibres.

Chalk, clay, carbon, silica or metal particles may, for instance, be used as fillers. Usually these particles are 2 micrometers–1 mm large. In addition, the skin-shaped product may contain catalysts, mould release agents, colourants and other usual additives. The usual catalysts may be used as catalyst, for instance p-toluenesulphonic acid and boric acid.

Mechanical properties that are useful in practice are obtained by using 10–50 wt% fibrous material and 90–50 wt% resin mixture, with the resin mixture preferably containing 15–80 wt% fillers and 85–20 wt% aminoplast resin. More in particular, 20–30 wt% fibrous material and 80–70 wt% resin mixture is used, with the resin mixture containing 40–70 wt% fillers and 30–60 wt% resin.

The process according to the invention for the preparation of a skin-shaped product by impregnating fibrous material in the form of a fleece or a mat with an aminoplast resin mixture is characterized in that the fibrous material has a tensile strength of at least 1 MPa, and that the impregnated material is dried, until the aminoplast resin mixture has a viscosity of more than 25 Pa.s at 120° C.

The amount of resin mixture used per m² of fibre mat or fleece can be easily adjusted by removing resin mixture, for example with the aid of rollers. By adapting the viscosity of the aqueous resin mixture, it is also possible to apply more or less to the fibrous material.

To obtain a dry skin-shaped product, most of the water must be removed after the impregnation step. A residual moisture content of less than 5% appears to give good results. Too much free water may cause pores in the product ultimately obtained. Water can be simply removed by passing the skin-shaped product through an oven. Since the product is not produced between two films, as in the case of polyester SMCs, the water can evaporate well on all sides.

The skin-shaped products obtained are usually between 0.2 mm and 5 mm thick. Thinner products are economically less attractive, thicker products may cause problems in drying and/or may stick together when they are rolled up. After the products have dried, they can be stacked very well to form sheet moulding compounds with thicknesses from 1 mm to a few centimeters.

The sheet moulding compounds obtained can be simply processed into products in compression moulds. The pressure applied in curing is usually between 10 and 200 bar, preferably between 20 and 100 bar.

The products obtained present very good mechanical properties and the fibrous material is dispersed throughout the entire product. Representative mechanical strengths for 30 vol% glass fibre reinforcement with 5 mm–50 mm long fibres are: flexural strength (ASTM D 790) of 100–200 MPa, modulus of elasticity (ASTM-D 790) of 7–15 GPa and impact resistance (ISO 179) of 5–60 kJ/m$^{-2}$.

The skin-shaped products are excellently suitable for use in the production of large moulded parts with, for example, ribs and projections, such as chair seats, casings, fittings, car body parts. The excellent flame-resistant properties, thermal stability, high heat distortion temperature, resistance to scratching and good colourability of the material are considerable advantages in such applications.

The invention will be elucidated with the following example, without being limited thereto.

EXAMPLE

Preparation of resin

In a reactor, 5 parts of caprolactam, 24 parts of water and 135 parts of formalin (30% formaldehyde in water with a pH of 9.4) were added to 100 parts of melamine. The condensation reaction was carried out at 95° C. until the dilutability of the resin at 20° C. was 1.2 kg of resin per kg of water. (the formaldehyde/melamine ratio was 1.7).

Preparation of skin-shaped product

In a blade mixer, 110 parts of CaCO$_3$ (75% solids in water) and 0.45 parts of paratoluenesulphonic acid (50% solids) were added to 100 parts of the above described resin (55% solids). The mixture was stirred until a homogeneous compound was obtained. The viscosity was set at 0.1 Pa.s by the addition of water (Brookfield at 20° C.). (Brookfield at 20° C.).

The resin mixture was poured into a bath of an impregnating machine of type VITS (LIA model). A glass fleece with a tensile strength of 1.1 MPa at 20° C. was passed through the bath with resin mixture. Superfluous resin mixture was removed by passing the impregnated fleece between two rollers (set 0.2 mm apart). The impregnated fleece was then passed through an oven at a temperature of 160° C. for 120 seconds, after which the dried resin mixture had a viscosity of 35 Pa.s at 120° C. (Brookfield).

Processing into final product

Twenty 0.3 mm thick layers of skin-shaped product were placed one on top of the other and compressed in a compression mould (Bürghle design LA 63) at a temperature of 160° C. and a pressure of 8.10$^{-2}$ N/m². The glass fibres appeared to be present in all projections, ridges and rims.

In an analogous manner test plates (with dimensions of 25×25×0.4 cm) were produced, whose mechanical properties were determined. The flexural strength according to ASTM-D 790 was 100 MPa, the modulus of elasticity (ASTM-D 790) 10 GPa, and the impact resistance (ISO 179) 15 kJ/m$^{-2}$. The heat distortion temperature (HDT) was more than 300° C., the flammability class according to UL-94 was V-0 while the limited oxygen index amounted to 40.

We claim:

1. Skin-shaped product comprising an aminoplast resin mixture which is the reaction product of an amino compound with formaldehyde and further including fibrous material, characterized in that the resin mixture has a viscosity of 25 Pa.s–15.10³ Pa.s at 120° C. in the skin-shaped product and that the fibrous material in the form of a fleece or a mat has a strength of 0.1 MPa–20 MPa at 20° C.

2. Product according to claim 1, characterized in that the product comprises 30–95 wt% resin mixture and 5–70 wt% fibrous material.

3. Product according to claim 1, characterized in that the resin mixture has a viscosity of 50 Pa.s–5000 Pa.s at 120° C.

4. Product according to claim 1, characterized in that the fibrous material has a strength of 1 MPa–10 MPa (at 20° C.).

5. Product according to claim 1, characterized in that the resin mixture contains 10–70 wt% fillers and 30–90 wt% resin.

6. Product according to claim 1, characterized in that glass fibre is used as fibrous material.

7. Product according to claim 1, characterized in that melamine is used as said amino compound.

8. Process for the production of a skin-shaped product by impregnating fibrous material in the form of a mat or a fleece with an aminoplast resin mixture which is the reaction product of an amino compound with formaldehyde, characterized in that the fibrous material has a tensile strength of more than 0.1 MPa and that the impregnated material is dried, until the aminoplast resin mixture has a viscosity of more than 25 Pa.s.

9. Product obtained with the process according to claim 8.

10. Moulded part obtained with the aid of a product according to claim 1.

* * * * *